United States Patent [19]

Tomlin et al.

[11] 4,320,777
[45] Mar. 23, 1982

[54] ACTUATOR MECHANISM FOR LIFT-TURN VALVES

[75] Inventors: Jerry B. Tomlin, Sugar Land; James N. Strickland, Houston, both of Tex.

[73] Assignee: Daniel Industries, Inc., Houston, Tex.

[21] Appl. No.: 159,513

[22] Filed: Jun. 16, 1980

[51] Int. Cl.³ ............................................. F16K 43/00
[52] U.S. Cl. ................................. 137/315; 251/229; 251/251; 251/298; 74/55
[58] Field of Search ................ 137/315; 251/229, 251, 251/298; 74/55

[56] References Cited

U.S. PATENT DOCUMENTS

2,716,016  8/1955  Allen .................................. 251/163
4,234,157 11/1980  Hodgeman ..................... 251/229 X Primary Examiner—Harold W. Weakley
Attorney, Agent, or Firm—Gunn, Lee & Jackson

[57] ABSTRACT

An actuator mechanism for lift-turn type valves such as tapered plug valves and cam energized plug and slip assemblies includes an actuator housing structure that is adapted to be connected to a valve body. An actuator element that is adapted for interconnection with the operating stem of a valve element includes a cam energized mechanism which is capable of imparting both linear and rotary movement to the valve stem for sequentially unseating the valve element, rotating it 90° to a selected position and moving it linearly in the opposite direction for reseating. During unseating and reseating linear movement, interengaging guide structure prevents undesired rotation of the actuator element and valve stem. An adjustment mechanism is provided to ensure optimum positioning of the actuator element relative to the valve stem. Energy transfer means is provided to ensure adequate transmission of forces during seating and unseating movement.

16 Claims, 10 Drawing Figures

ACTUATOR MECHANISM FOR LIFT-TURN VALVES

FIELD OF THE INVENTION

This invention relates generally to valves for controlling the flow of fluid in conduit systems and more specifically relates to lift-turn type rotary plug valves such as tapered plug valves or valves incorporating cam energized slip assemblies for achieving mechanically enhanced sealing. More particularly, the present invention is directed to a valve actuator mechanism that is adapted to control unseating, rotation and reseating of a tapered valve plug or plug and slip assembly of a valve mechanism during each cycle of opening or closing movement thereof.

BACKGROUND OF THE INVENTION

Of the various types of valves utilized for controlling the flow of fluid within conduit systems, rotary plug valves have been found to be quite popular. Rotary plug valves are typically of compact, low profile design and yet offer much the same fluid flow dimension that is provided by many other types of valves having much larger physical dimensions. Where physical size and height is an important or mandatory design consideration, rotary plug valves are widely specified. Rotary plug valves are typically of simple nature, utilizing few moving parts and are of nominal cost. These various advantageous features substantially enhance the competitive nature of plug valves.

Among the disadvantages of rotary plug valves, however, are the disadvantages of operational pressure range limitations and limitations from the standpoint of sealing capability. Most rotary plug valves function properly only at relatively low pressure ranges, for example, in the order of 0-150 psig. This operational pressure restriction, in many flow systems, requires that other less desirable, but higher pressure valves be utilized. Where plug valves incorporate lubricant enhanced sealing, additional sealant must be introduced into the sealant chambers quite often to ensure against leakage. This requirement is an expensive service consideration which is frequently detrimental to the employment of such valves. Also, the lubricant sealant must be compatible with the product controlled by the valve, thus ensuring against contamination of the product.

In many cases, elastomeric sealing material is incorporated in plug valve mechanisms for establishment of a seal between the rotatable plug and the sealing surfaces of the valve body. Elastomeric sealing material, however, tends to wear at a fairly rapid rate, especially in valves of larger size where the sealing elements slide a considerable distance in contact with the internal sealing surfaces of the valve. Rapid wear of this nature presents a problem from the standpoint of servicing, especially if the valve is intended for frequent cycling during use. The sealing elements of plug valves can also become damaged when opened or closed under high pressure or high velocity service conditions. For example, during 90° rotation of the plug element, the sealing elements must move past the various ports defined by intersection of the flow passages of the valve with the valve chamber. When this activity occurs, the violent activity that is created by the flowing fluid medium can partially extrude or otherwise force the sealing material of the seals from the seal grooves. Rotation of the plug member while in sealing contact with the valve body can cause the sealing elements to be cut or otherwise damaged as they slide past the valve ports, thus requiring replacement of the seals. To prevent excessive wear or damage of the seals of tapered plug valves, it is desirable to actuate such valves between open and closed positions thereof by unseating, rotational and reseating increments of valve movement. Unseating of tapered plugs is accomplished by moving the plug linearly until the seals of the plug are moved clear of corresponding seat surfaces of the valve. The plug is then rotated to a selected position, being free of any contact with the seat surface during rotation. After being properly positioned, the plug is then moved linearly in the opposite direction to again bring the sealing elements thereof into seating contact with the seat surface.

THE PRIOR ART

To gain the advantages of reasonably high operational pressure and extended service life of sealing material, plug valves have been developed that incorporate mechanically enhanced sealing such as indicated by U.S. Pat. No. 3,362,433 of Heinen and commonly assigned U.S. patent application Ser. No. 926,283 of Hodgement and Ali. In valves of this nature, a rotatable plug element having a flow port formed therein is provided with external interlocking connections and cam surfaces that mate with interlocking connections and cam surfaces defined by a pair of slip elements. The slip elements incorporate sealing elements typically of the molded elastomeric type with sealing surfaces defined within the valve body as the slip elements are moved laterally by the interengaging tapered cam surfaces of the plug member and slips. A valve actuator imparts vertical movement to a valve stem, and a cam follower and groove system of the actuator imparts linear and rotational movement to a valve stem and plug member. Seal life is materially enhanced due to lateral movement of the slips into direct sealing engagement with the seating surface of the valve body. High pressure service capability is promoted by cam induced mechanically enhanced sealing of this nature.

Lift-turn type valve actuator systems are also utilized in tapered plug valve systems as taught by U.S. Pat. Nos. 2,715,838 and 2,716,016 of Allen. In the patents of Allen, a crank type cam and eccentric cam system is employed to accomplishing unseating, rotation and reseating movement of the tapered valve plug.

In the case of actuator systems employing crank and eccentric cam systems for inducing linear and rotary movement, such as in the case of the Allen patents identified above, a considerable amount of free rotational movement can occur when the crank member is centralized between opposed cam follower surfaces. When the actuator mechanism is in this position, the velocity and pressure induced forces that act on the plug member can cause inadvertent shifting of the plug member to an undesired, partially rotated position. It is desirable therefore to provide means for ensuring against any inadvertent rotary movement of the actuator mechanism and plug member in response to velocity and pressure induced forces.

Under circumstances where a circular cam is in contact with cam follower surfaces of planar configuration, such contact can be said to be line contact. Where force transition occurs through line contact, obviously the forces transmitted must be minimized in order to prevent undesired yielding of the material for the reason that the surface contact is minimal and the yield point of the material can be easily exceeded. It is desirable, therefore, to provide an eccentric cam energized system for accomplishing desired phases of actuator movement and wherein the surface contact for purposes of force transmission is quite large and thus the force per unit area is minimized.

In view of the fact that employment of wide tolerances during manufacture typically result in minimized manufacturing costs, it is desired to employ wide tolerances in the manufacture of valve actuator mechanisms. It is also desirable, however, to ensure accurate relative positioning of certain components of valve actuator assemblies in order to assure optimum operational characteristics thereof.

SUMMARY OF THE INVENTION

In view of the foregoing, it is a primary feature of this invention to provide a novel valve actuator mechanism for lift-turn type valves which makes use of a commercially proven crank and eccentric cam system to achieve linear and rotational movement of a valve mechanism and yet which provides efficient restriction against undesired rotational movement during the phases of linear movement thereof.

It is also a feature of this invention to provide a novel lift-turn type valve actuator mechanism that is designed to accommodate rather wide manufacturing tolerances and yet employs a simple and efficient adjustment feature that promotes quite accurate relative positioning of desired internal operational components thereof.

It is an even further feature of this invention to provide a novel lift-turn type valve actuator mechanism wherein an eccentric cam mechanism is incorporated for the purpose of accomplishing linear actuator movement and yet large surface contact area is provided to minimize the force per unit area ratio of force transmission and assure against undesired metal deformation or excessive wear.

Other and further objects, advantages and features of the invention will become obvious to one skilled in the art upon an understanding of the illustrative embodiment about to be described, and various advantages, not referred to herein, will occur to one skilled in the art upon employment of the invention in practice.

Briefly, the present invention concerns a valve actuator mechanism that employs a commercially proven eccentric cam mechanism for the purpose of imparting linear movement to a valve stem for unseating and reseating a valve element and also employs a crank and cam follower system for accomplishing 90° rotary movement for selective shifting of the valve stem and valve element to the open or closed positions thereof. The valve mechanism incorporates a valve actuator element that is positioned for both linear and rotary movement within an actuator housing. The actuator element is formed to define force transmission surfaces that are engaged by an eccentric element positioned in eccentric manner on an actuator shaft that is journaled for rotation relative to the actuator housing structure. The actuator element is also formed to define cam follower surfaces that are operatively engaged by a crank element that also extends from the actuator shaft and functions to induce rotary movement to the actuator element upon rotation of the actuator shaft and crank element.

To prevent the actuator element and a valve stem interconnected therewith from inadvertent rotation due to velocity and pressure induced forces of the fluid controlled by the valve mechanism, guide means provides the actuator element with a positive guiding function during increments of linear movement. This linear guiding mechanism is so constructed that it does not in any way interfere with rotary movement of the actuator element.

The valve actuator mechanism is provided with means to ensure accurate selective positioning of the linear relationship between the actuator element and a valve stem that is movable thereby. A stem connector element is provided with an adjustable threaded connection that may be made up as desired to achieve accurate relative positioning of the valve stem and actuator element. Means is also provided for locking the adjustment mechanism to ensure against inadvertant misadjustment during use.

An eccentric cam mechanism for accomplishing linear movement of the actuator element is provided with an efficient force transmission structure that ensures transition of seating and unseating forces by means of large area force transmitting elements. This ensures that efficient translation of forces during opening and closing movement of the valve mechanism is effectively achieved and at the same time the force per unit area ratio is maintained well within the yield characteristics of the metal material from which the valve actuator components are constructed.

BRIEF DESCRIPTION OF THE DRAWINGS

In order that the manner in which the above-recited advantages and objects of the invention are attained, as well as others, which will become apparent, can be understood in detail, more particular description of the invention, briefly summarized above, may be had by reference to the specific embodiments thereof that are illustrated in the appended drawings, which drawings form a part of this specification. It is to be understood, however, that the appended drawings illustrate only typical embodiments of the invention and therefore are not to be considered limiting of its scope, for the invention may admit to other equally effective embodiments.

In the Drawings

DETAILED DESCRIPTION OF PREFERRED EMBODIMENT

Figure 1:
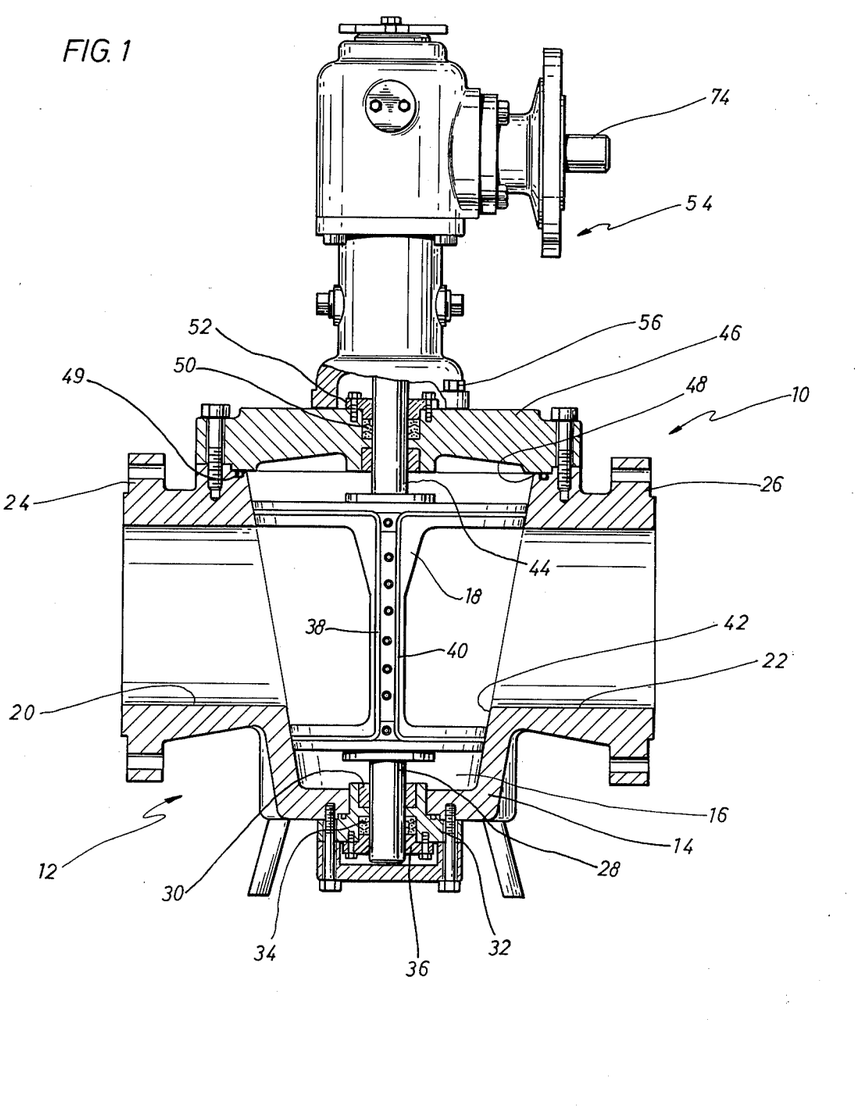
FIG. 1 is a sectional view of a four-way valve mechanism incorporating a tapered plug type valve element and also incorporating a valve actuator mechanism constructed in accordance with the present invention.

Referring now to the drawings and first to FIG. 1, a valve and valve actuator are illustrated generally at 10 wherein the valve, illustrated generally at 12, is a four-way plug valve such as a typically utilized for diverting flowing fluid in a flow system. The valve mechanism 12 incorporates a valve body structure 14 which is formed to define a valve chamber 16 within which a movable valve plug member 18 is positioned. The valve body structure is also formed to define flow passages 20 and 22 that are in fluid communication with the valve chamber 16 and through which fluid flows under control of the plug member 18. Connection flanges 24 and 26, or any other suitable connector devices, are provided on the valve body structure to enable the valve body to be interconnected with appropriate connector elements of a flow system.

The plug member 18 is provided with a trunnion 28 at one side thereof which is rotatably supported by means of a bearing 30 that is in turn retained by a bearing and seal assembly 32. The trunnion 28 is sealed with respect to the bearing and seal assembly by means of a packing 34 which maintains an appropriate seal with the trunnion during linear and rotary movement thereof. The packing assembly 34 is secured with respect to the bearing and packing retainer by means of a retainer element 36 that is bolted or otherwise appropriately secured to the bearing and packing assembly 32.

The plug member 18 is adapted for sealing with respect to the valve body 14 by means of sealing elements 38 and 40 that are appropriately secured to the plug member 18 and are adapted for sealing engagement with a sealing surface 42 defining a portion of the wall structure of the valve chamber 16. The plug member is also provided with an actuator stem 44 that extends through a valve stem passage which is formed in a bonnet or closure plate 46. The closure plate is secured by bolts or by other suitable means of connection to the valve body 14, thus defining a closure for an access opening 48 that is formed by the valve body. A sealing element 49 is received within a seal groove formed in the valve body about the access opening 48 and functions to establish a seal with the bonnet structure 46 of the valve. The actuator stem 44 is sealed with respect to the bonnet 46 by means of a packing assembly 50 that is appropriately retained within the stem passage by means of a packing retainer 52.

A valve actuator, illustrated generally at 54, is secured to the bonnet structure 46 by means of bolts 56 and is interconnected in driving relation with the valve stem 44 and is capable of imparting both linear and rotary movement to the valve stem, thus inducing linear and rotary movement to the plug member 18.

Figures 2, 2A:
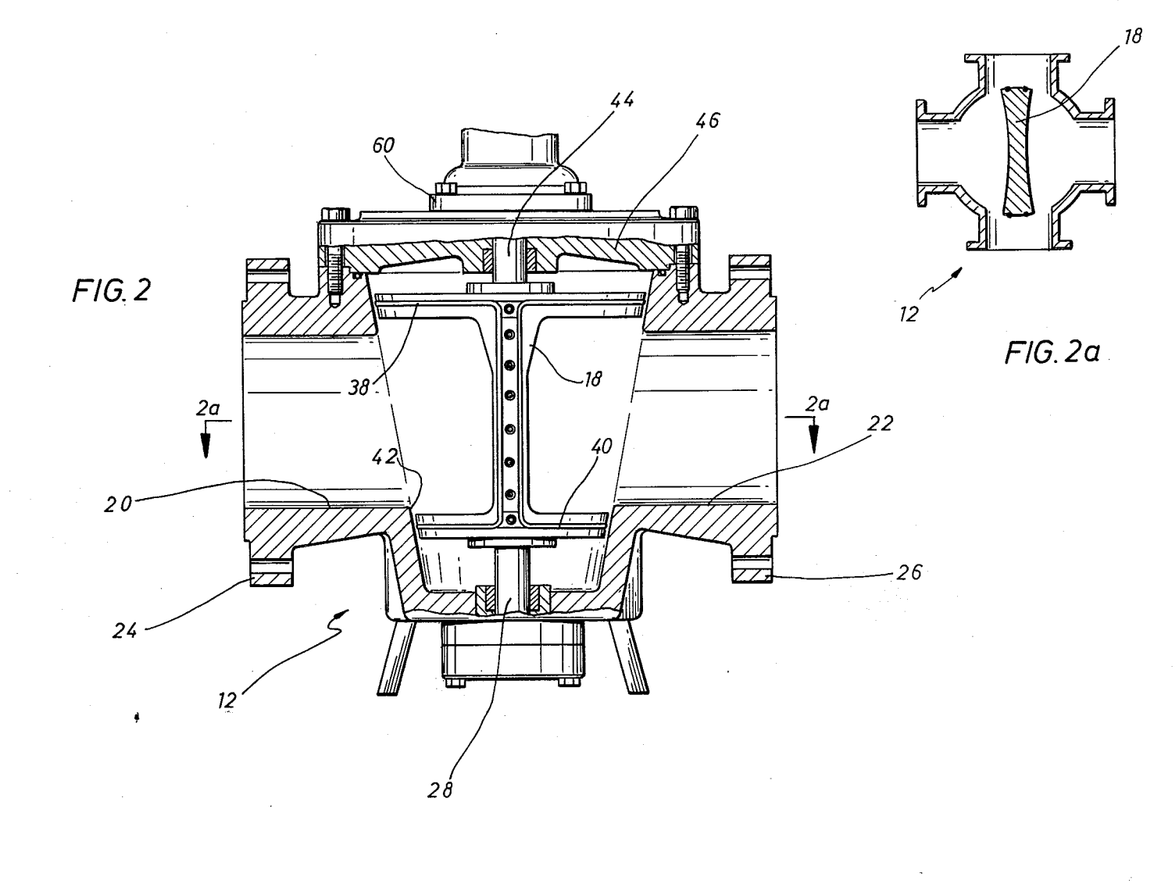
FIG. 2 is a partial sectional view of the valve mechanism of FIG. 1, illustrating the tapered plug element thereof after linear movement to the unseated position and prior to rotation to a selected position.
FIG. 2a is a sectional view taken along line 2a—2a of FIG. 2 showing further details of the valve structure.

It is desirable to cause unseating of the sealing elements 38 and 40 with respect to the seat surface 42 in order that seal wear will not occur as the plug member 18 is rotated between selected positions thereof. Further, it is also desirable to ensure that the torque force which is required to induce rotary movement to the plug member be maintained as low as possible during all phases of operation. To accomplish these features, a valve actuator mechanism is employed that has the capability of initially imparting linear movement to the plug member along the axis defined by the valve stem and trunnion for the purpose of accomplishing unseating. The unseated position is illustrated in FIG. 2 wherein the seal elements 38 and 40 are shown clear of the seat surface 42. After being moved linearly to the position illustrated in FIG. 2, the plug element 18 is then rotated to a desired position and is then moved linearly in the opposite direction to achieve reseating of the plug member with respect to the seat surface 42. To accomplish such linear and rotational movement of the plug member, the valve actuator mechanism 54 may conveniently take the form illustrated in detail in FIG. 3. The actuator mechanism incorporates a yoke tube 58 having a connector base portion 60 that is secured to the bonnet structure 46 of the valve of means of bolts 56. The yoke tube 58 is further formed to define a connection flange structure 62 that defines an annular recess 64 providing accurate orientation and proper seating for one extremity of an actuator housing 66. The actuator housing 66 is secured in assembly with the flange 62 of the yoke tube 58 by means of a plurality of bolts 68 and is sealed with respect to the yoke tube by means of an annular sealing element 70. An actuator element 72 is movably positioned within the actuator housing and is movable in controlled manner upon rotation of an actuator shaft 74 in the manner described in detail hereinbelow. The actuator element 72 is formed to define a generally cylindrical upper portion 76 that extends through an opening 78 defined in the actuator housing 66. The cylindrical portion 76 of the actuator element is sealed with respect to the actuator housing by means of an annular sealing element 80, such as an O-ring or the like, that is received with an appropriate seal groove formed in the actuator housing structure. A position indicator element 82 is secured to the exposed extremity of the actuator element 72 by means of a bolt 84 and serves to provide operating personnel with a visual indication of the position of the actuator mechanism and rotatable plug of the valve.

Figure 3:
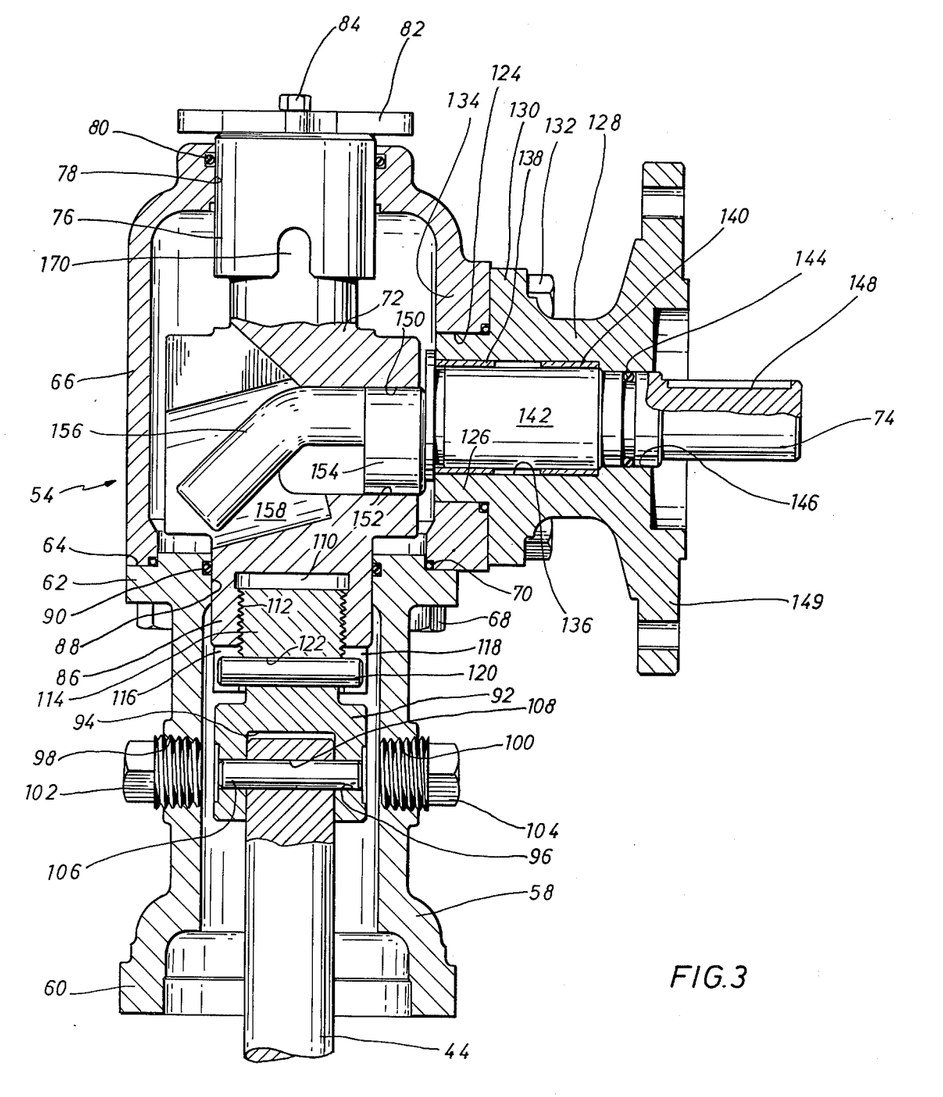
FIG. 3 is an enlarged sectional view of the valve actuator mechanism of FIG. 1, illustrating the internal structure components thereof in detail.

The lower or inner extremity 86 of the actuator element 72 is also of generally cylindrical external configuration and extends through an opening 88 defined by the yoke tube 58. An annular sealing element 90, such as an O-ring or the like, is received within an annular groove formed within one extremity of the yoke tube 58 and functions to establish a seal between the actuator element and the yoke tube. It should be noted that the sealing surfaces defined by cylindrical portions 76 and 86 are of the same diameter and thus the sealing elements 80 and 90 are also of the same diameter. To provide lubrication and protection for the internal parts of the valve actuator mechanism, the internal chamber defined by the housing 66 is at least partially filled with oil or another suitable lubricant. As the actuator element 72 moves vertically there is no volumetric change in the lubricant chamber that would otherwise require pressure or volumetric compensation.

For the purpose of establishing interconnection of the actuator element with the valve stem 44 of the valve, a stem connector element 92 is provided having a receptacle 94 defined at one end thereof which is adapted to receive the free extremity of the valve stem 44. A transverse bore 96 is also defined within the stem connector element 92 in intersecting relation with the receptacle 94 and is adapted for registry with a transverse bore formed in the free extremity of the valve stem 44. Connection between valve stem and connector elements is achieved by positioning a connector pin through the registering apertures of the connector element and valve stem. In order to gain access to the free extremity of the connector element 92 for the purpose of installing or removing the connector pin therefrom, the yoke tube 58 is formed to define opposed access openings 98 and 100 that are ordinarily closed by means of a pair of closure plugs 102 and 104. With the closure plugs removed, a connector pin 106 may be positioned within the registering bores 96 and 108. With the closure plugs in place, the connector pin 106 is not capable of becoming disassembled from its retaining interconnection with the valve stem and connector element.

It is desirable to provide for adjustment of the connector element 92 with respect to the actuator element 72 in order that wide manufacturing tolerances may be employed during the manufacturing process and yet the various internal parts of the valve actuator mechanism will be accurately positioned when in assembly. In order to accomplish such adjustment, the extremity 86 of the actuator element 72 is formed internally to define an adjustment receptacle 110 having a portion of the wall surfaces thereof defining internal threads 112 that receive an externally threaded extremity 114 of the connector element 92. The extremity 86 of the actuator element is also formed to define a pair of opposed slots or recesses 116 and 118 that are of sufficient width to receive a lock pin 120 in close fitting relation therein. The connector element 92 is formed to define a transverse bore 122 within which the lock pin 120 is received when the bore 122 is positioned in registry with the opposed locking recesses 116 and 118. With the lock pin 120 removed from the transverse bore 122, the threaded interconnection of the connector element 92 and actuator element 72 may be adjusted simply by relative rotation of the connector element and actuator element, thus achieving appropriate linear positioning of these components. After proper positioning has been accomplished, the lock pin 120 is inserted into the transverse bore 122 and into the registering lock recesses 116 and 118. When positioned within the yoke tube 58, the lock element 120 cannot become inadvertently disassembled from its locking position within the locking bore and lock recesses.

It is desired to impart selective linear and rotary increments of movement to the actuator element 72 and thus to impart such increments of linear and rotary movement to the valve stem 44. This feature is conveniently accomplished by the actuator mechanism illustrated in FIG. 3. The housing 66 is formed to define a transverse or side opening 124 within which is received an annular projecting portion 126 of an actuator shaft adaptor 128. The adaptor 128 includes an integral connector flange 130 through which bolts 132 extend in order to secure the actuator adaptor to a receiving portion 134 of the actuator housing. The actuator adaptor is formed internally to define a shaft receptacle bore 136 that receives bearing support bushings 138 and 140 therein. The bushings provide rotation support journals for a cylindrical portion 142 of the actuator shaft 74. The actuator shaft is sealed with respect to the actuator adaptor 128 by means of an annular sealing element 144 that is received within a seal groove formed in the actuator shaft and which engages a cylindrical sealing surface 146 that is defined within the actuator adaptor. The actuator adaptor is also formed to define an outer connection flange 149 that provides support for any suitable mechanized shaft rotating mechanism such as a manual actuator drive, motorized actuator drive, etc. The actuator drive mechanism will be interconnected in driving relation with respect to the actuator shaft 74 by any suitable apparatus being interconnected to the shaft 74 by means of a key that is received within a keyway 148. Obviously, any other suitable means for accomplishing controlled rotation of the actuator shaft 74 may be appropriately used within the spirit and scope of the present invention.

The actuator element 72 is formed internally to define opposed cam surfaces 150 and 152 that are formed by a transverse slot extending through the actuator element in such manner as to orient the surfaces 150 and 152 in substantially normal relation with respect to the axis of rotation of the actuator element. The actuator shaft 74 is formed to define an eccentric cam 154 having a substantially circular outer cam surface that imparts linear driving forces to the surfaces 150 and 152, depending upon the position of the cam relative to the actuator element. As the actuator shaft 74 is rotated, the eccentric cam 154 is also rotated causing forces to be induced to the actuator element to drive it upwardly or downwardly in linear manner. It will be appreciated that the actuator element will be driven upwardly or downwardly in continuous manner as the cam 154 rotates with exception of top and bottom dead center positions where, for an instant, vertical movement is zero.

Figure 5:
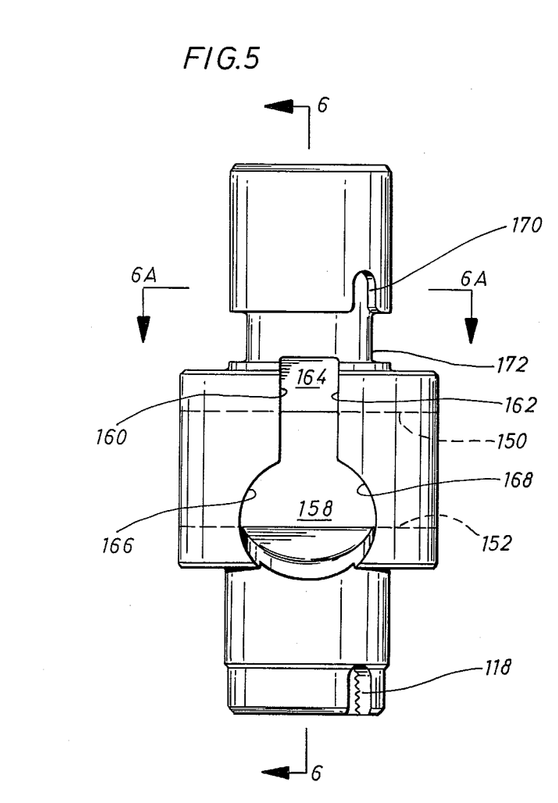
FIG. 5 is an elevational view of the rotatable and linearly movable actuator element shown separated from the valve actuator mechanism of FIG. 3 and showing the cam surfaces and linear guide feature thereof in detail.
Figure 6:
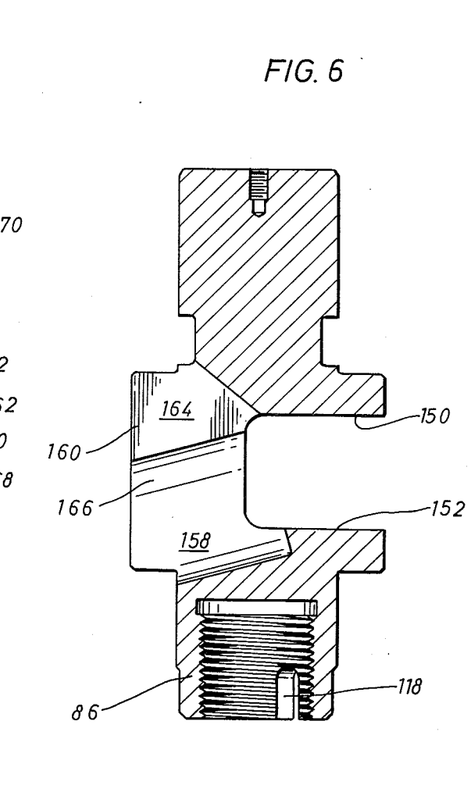
FIG. 6 is a sectional view taken along line 6—6 of FIG. 5 and illustrating further details of the actuator element.
Figure 6A:
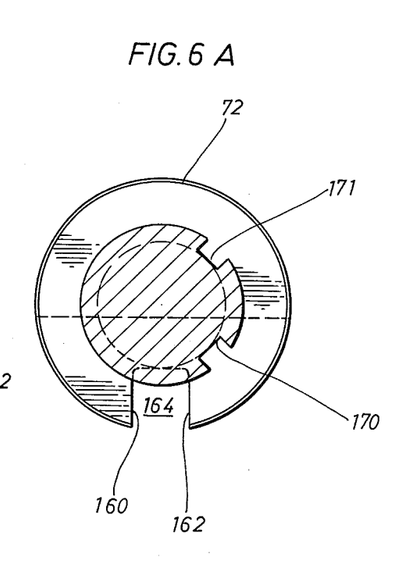
FIG. 6a is a sectional view taken along line 6a—6a of FIG. 6 and showing further details of the valve structure.

It is also desired to induce 90° rotary movement to the actuator element 72 and to transfer such rotary movement to the actuator shaft 44. This feature is conveniently accomplished by providing a crank element 156 which is formed integrally with the actuator shaft 74. The crank portion 156 of the actuator shaft is received within a cavity 158 defined in the actuator element 72 which is in communication with the slot defined by surfaces 150 and 152. The cavity 158 is of a configuration best illustrated in FIGS. 5 and 6 and is defined in part by generally parallel surface portions 160 and 162 that form a centrally located slot 164 within which the angulated crank 156 is received when the crank is positioned in an upwardly directed manner. During certain portions of the continuous upward and downward movement of the actuator element, the crank element enters the slot 164 and imparts a transverse force to respective ones of the surfaces 160 or 162, thus causing rotation of the actuator element about its vertical center of rotation. It is appreciated, therefore, that during certain segments of cam rotation inducing continuous linear movement of the actuator element, 90° rotational movement is also simultaneously induced to thus achieve desired positioning of the valve element 18.

The cavity 158 is enlarged to define a lower generally oval portion defining side surfaces 166 and 168. After the actuator element and valve element have been properly positioned, the actuator element is then moved linearly to cause reseating of the valve element. During this linear reseating movement, as well as during linear plug unseating movement, rotary movement of the actuator element is undesirable. Moreover, the crank element 156 must have freedom of rotation relative to the actuator element without inducing rotary movement thereto. Obviously, since the crank element 156 is movable relative to the actuator element within the oval portion of the cavity 158, the actuator element conversely is also rotatably movable with respect to the crank element. Thus, the actuator element and valve stem are ordinarily capable of a considerable degree of inadvertent relative rotation during segments of linear movement.

Figure 4:
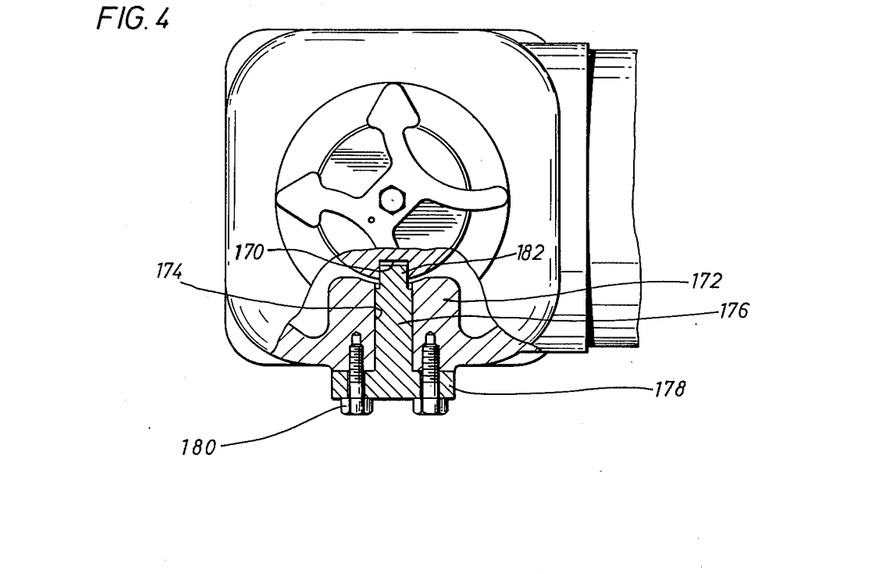
FIG. 4 is a partial plan view of the valve actuator mechanism of FIG. 3 having a portion thereof broken away and shown in section to illustrate the linear guide mechanism of the apparatus in detail.

Velocity and pressure induced forces can therefore shift the valve element to a misaligned position as it is moved linearly during seating and unseating. In accordance with the present invention, however, it is intended to restrict rotation of the actuator element during segments of linear movement. This feature is conveniently accomplished by forming the actuator element 72 to define at least one guide recess 170 that is oriented in substantially parallel relation with respect to the axis of rotation of the actuator element. As shown in FIG. 4, the actuator housing 66 defines an internal boss 172 and a guide pin bore 174 is formed in the boss. An actuator guide element 176 is extended through the bore 174 and is provided with an outer flanged portion 178 that is interconnected with the housing structure by means of bolts 180 that extend through the flange and are received in threaded engagement within bores formed in the actuator housing. The actuator guide element 176 defines a guide extremity 182 that is selectively receivable within the guide recesses 170 and 171, thus restricting the actuator element 72 against rotation during the linear movement that occurs at each of the valve seating positions thereof.

In operation, the actuator shaft 74 is rotated, inducing rotational movement to the eccentric cam 154 and the crank 156. During a first increment of movement, the actuator element 72 is moved linearly in an upward direction as shown in FIG. 3, causing the guide portion 182 of the guide element 176 to be withdrawn from the guide recess 170 or 171 within which it is received. This upward linear movement of the actuator element also induces upward linear movement to the valve stem 44, thereby causing the valve element 18 to be moved upwardly to its unseated position as shown in FIG. 2. After this has been accomplished, the crank element 156, upon continued rotation of the actuator shaft 74, reacts with appropriate ones of the surfaces 160 and 162 of the slot 164, thereby inducing rotary movement to the actuator element 72 and to the valve stem 44 interconnected therewith. The crank 156 is of such configuration that 180° rotation thereof induces 90° rotation to the actuator element 72. After the actuator element has been rotated 90°, continued rotation of the actuator shaft causes the eccentric cam 154 to react against the cam surface 152 thereby inducing downward linear movement to the actuator element and to the valve stem. Since the actuator element has been rotated 90°, the opposite one of the recesses 170 and 171 are brought into registry with the guide portion 182 of the guide element, thus restricting the actuator element 72 against rotation during linear reseating movement as the valve stem and valve element are moved downwardly to the reseated position thereof.

Figure 7:
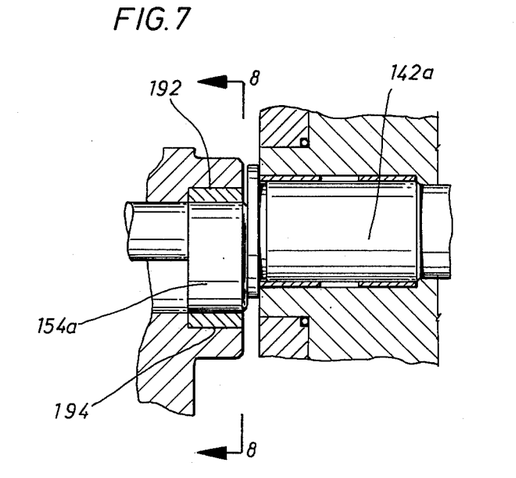
FIG. 7 is a partial sectional view of a valve actuator mechanism constructed in accordance with this invention and representing an alternative embodiment of the invention.
Figure 8:
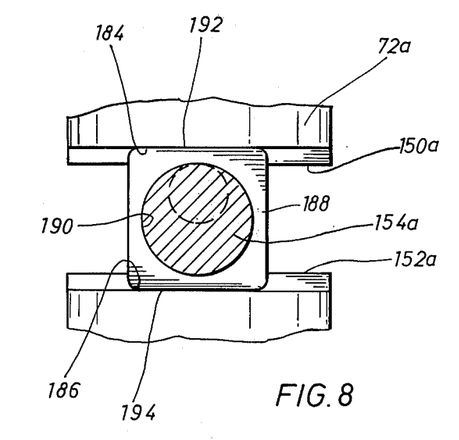
FIG. 8 is a sectional view taken along line 8—8 of FIG. 7 and illustrating the force transition structure of the actuator mechanism in further detail.

As mentioned above, the cam responsive surfaces 150 and 152 are of substantially planar configuration and the eccentric cam element 154 has essentially line contact with surfaces 150 and 152 during rotation of the cam. Under circumstances where reactive forces are quite high, this line contact can develop a force per unit area ratio that is sufficiently high as to cause undesired yielding or wear of the metal structures from which the actuator element and eccentric are composed. In order to provide for efficient transfer of forces between the eccentric cam and the actuator element, the valve actuator mechanism may conveniently take the alternative form that is illustrated in FIGS. 7 and 8. The actuator element structure 72a defining the transverse slot formed by substantially planar surfaces 150a and 152a is further formed so as to define opposed receptacle recesses 184 and 186. The receptacle recesses are adapted to receive a force transfer element 188 having a circular opening 190 formed therein that is adapted to receive the eccentric cam element 154a in close-fitting, rotatable relation therein. As the eccentric cam element 154a is rotated by the actuator shaft, the reaction force induced thereby is transmitted through the circular surface 190 into the force translating element 188. This force is then transmitted through surfaces 192 or 194 of the force translating element into the metal structure of the actuator element by means of the interfacing surfaces defined by the recesses 184 and 186. Rather than establishing line contact between the cam element and the actuator element as in FIG. 3, the force translating element 188 establishes surface area contact that is sufficiently large to ensure that translated forces are well within the yield strength of the material from which the actuator element and cam are composed.

In view of the foregoing, it is apparent that the present invention is one well adapted to attain all of the objects and advantages hereinabove set forth, together with other advantages which will become obvious and inherent from a description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set forth or shown in the accompanying drawings are to be interpreted as illustrative and not in any limiting sense.

Having thus explained my invention in detail,
What is claimed is:

1. A valve actuator mechanism for lift-turn type valves wherein linear and rotary components of movement are induced to a valve stem during each opening or closing cycle of operation to cause unseating, rotation and reseating of a valve element, said valve actuator mechanism comprising:

an actuator element being formed to define an actuator cavity having crank energized cam surface means defined thereby and being formed to define eccentric energized cam surface means, said actuator element being adapted for connection to said valve stem;

an actuator shaft being positioned for rotation relative to said actuator element;

a crank element extending from said actuator shaft and adapted for camming engagement with said crank energized cam surface means to induce rotary motion to said actuator element upon rotation of said actuator shaft;

an eccentric element being provided on said actuator shaft and adapted for camming engagement with said eccentric energized cam surface means to induce linear motion to said actuator element upon rotation of said actuator shaft;

first guide means being provided on said actuator element; and second guide means being interengaged with said first guide means during linear motion of said actuator element to restrain said actuator element against rotary motion during said linear motion thereof.

2. A valve actuator mechanism as recited in claim 1, wherein:

said first guide means comprises guide recess means defined by said actuator element, said guide recess means being oriented in substantially parallel relation with the axis of rotation of said actuator element; and said second guide means being a substantially immovable guide projection, said guide projection being out of engagement with said guide recess means during rotary movement of said actuator element and being in guiding relation with said guide recess means during linear movement of said actuator element.

3. A valve actuator mechanism as recited in claim 2, wherein:

said recess means comprises at least one elongated guide slot; and said guide projection being at least one guide pin that is receivable within said guide slot.

4. A valve actuator mechanism as recited in claim 1, including:

an actuator housing receiving said actuator element in linearly and rotatably movable relation therein;

said first guide means being provided on said actuator element; and said second guide means being supported by said actuator housing.

5. A valve actuator mechanism as recited in claim 4, wherein:

said first guide means comprises guide recess means defined by said actuator element, said guide recess means being oriented in substantially parallel relation with the axis of rotation of said actuator element; and said second guide means being a substantially immovable guide projection, said guide projection being out of engagement with said guide recess means during rotary movement of said actuator element and being in guiding relation with said guide recess means during linear movement of said actuator element.

6. A valve actuator mechanism as recited in claim 5, wherein:

said recess means comprises at least one elongated guide slot; and said guide projection being at least one guide pin that is receivable within said guide slot.

7. A valve actuator mechanism as recited in claim 6, wherein:

said housing is formed to define a guide receptacle; and said guide projection extending through said guide receptacle and positioning a guiding portion thereof in projecting relation within said housing for contact within said guide recess means.

8. A valve actuator mechanism as recited in claim 1, including:

stem connection means for establishing interconnection of said actuator element with said valve stem;

means for linear adjustment of said stem connection means relative to said actuator element; and locking means for securing said stem connection means and said actuator element at the relative adjusted positions thereof.

9. A valve actuator mechanism as recited in claim 8, wherein said linear adjustment means comprises:

connection and adjustment threads being formed on said actuator element and said stem connection means, said threads being controllably made up to establish desired relative positioning of said actuator element and said stem connection means.

10. A valve actuator mechanism as recited in claim 9, wherein:

said actuator element and said stem connection means cooperate to define lock receptacle means; and a lock pin is received by said lock receptacle means and secures said connection and adjustment threads against inadvertent relative movement.

11. A valve actuator mechanism as recited in claim 8, wherein said actuator housing comprises:

a yoke tube adapted for connection to a valve housing;

said actuator housing being releasably connected to said yoke tube and positioning said stem connection means at least partially within said yoke tube.

12. A valve actuator mechanism as recited in claim 11, wherein:

said yoke tube defines a pair of opposed stem connection access openings; and said stem connection means defines a receptacle for receiving a valve stem and a transverse bore positioned for registry with a bore formed in said valve stem, said transverse bore being accessible through said stem connection access openings.

13. A valve actuator mechanism as recited in claim 12, wherein:

removable closure plug means are received by said access openings.

14. A valve actuator mechanism as recited in claim 11, wherein:

first seal means establishes a seal between said yoke tube and said actuator element; and second seal means establishes a seal between said actuator housing and said actuator element.

15. A valve actuator mechanism as recited in claim 1, wherein:

said actuator element is formed to define a force transfer receptacle;

a force transfer element being positioned within said force transfer receptacle and establishing surface-to-surface contact with opposed surfaces of said actuator element, said force transfer element being formed to define a circular opening receiving said eccentric element therein.

16. A valve actuator mechanism as recited in claim 15, wherein:

said eccentric element is of circular configuration.

* * * * *